United States Patent [19]
Skidmore

[11] Patent Number: 5,651,835
[45] Date of Patent: Jul. 29, 1997

[54] MODEL RAILROAD WHEEL CLEANING EQUIPMENT AND METHOD

[76] Inventor: Forrest G. Skidmore, 41 S. Hickory St., Palatine, Ill. 60067

[21] Appl. No.: 512,124

[22] Filed: Aug. 7, 1995

[51] Int. Cl.$^6$ .................................................. B60S 3/04
[52] U.S. Cl. ........................ 134/32; 134/39; 134/40; 15/53.4; 15/224; 15/224.4
[58] Field of Search .................... 15/210.1, 224, 15/244.1, 244.3, 244.4, 53.4; 134/32, 39, 40

[56] References Cited

U.S. PATENT DOCUMENTS

| | | | |
|---|---|---|---|
| 302,711 | 7/1884 | Cushman | 15/424 |
| 890,342 | 6/1908 | Dean | 15/224 |
| 3,015,834 | 1/1962 | Marrinson et al. | 15/224 |
| 5,060,335 | 10/1991 | Webster | 15/97.1 |

FOREIGN PATENT DOCUMENTS

| | | | |
|---|---|---|---|
| 223816 | 2/1958 | Australia | 15/224 |

*Primary Examiner*—Jeffrey Snay
*Attorney, Agent, or Firm*—Charles F. Lind

[57] ABSTRACT

The disclosed model railroad car wheel cleaning device has a structural base, and mats sandwiching the opposite broad faces of the base with each mat having many pairs of elongated substantially parallel grooves formed therein. The grooves are laterally spaced apart to receive the wheel flanges when the wheels are positioned against the mat. The mat material is durable, resilient, elastic and has minute open cells, capable of holding liquid solvent effective for removing particulate buildups on the car wheels. The car wheels are cleaned by wetting one of the mats with solvent, positioning the wheels against this mat with the wheel flanges in paired grooves, and rolling the railroad car along the mat in line with the grooves operable to wet end abrade the wheels for removing particulate buildups therefrom. The railroad car can further be positioned against and rolled along the second mat with the wheel flanges seated in paired grooves operable to dry and buff the wheels.

12 Claims, 1 Drawing Sheet

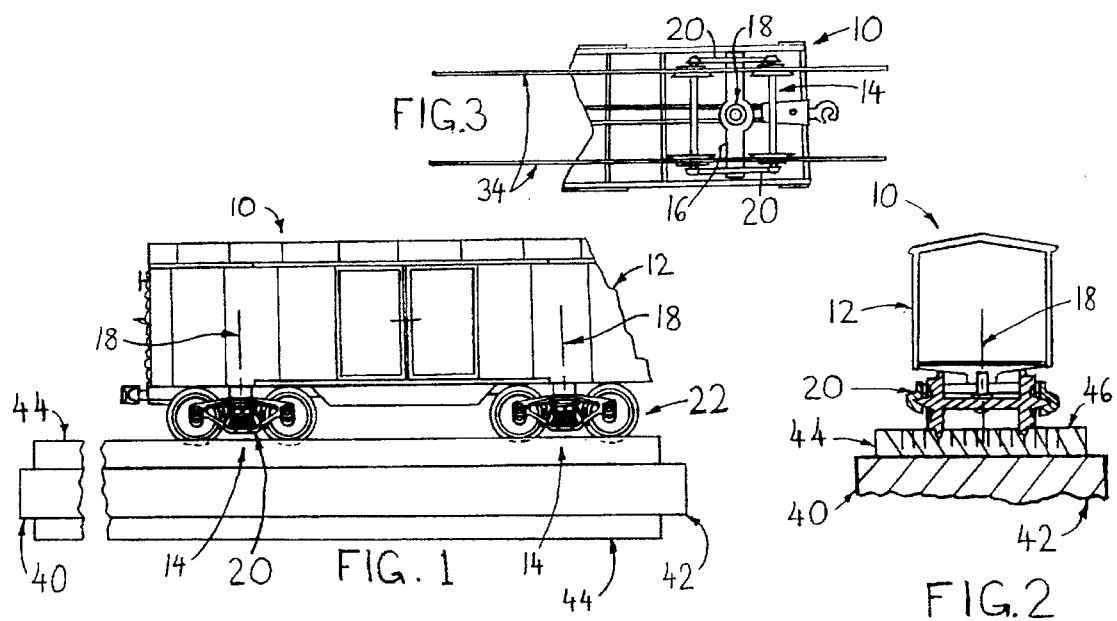
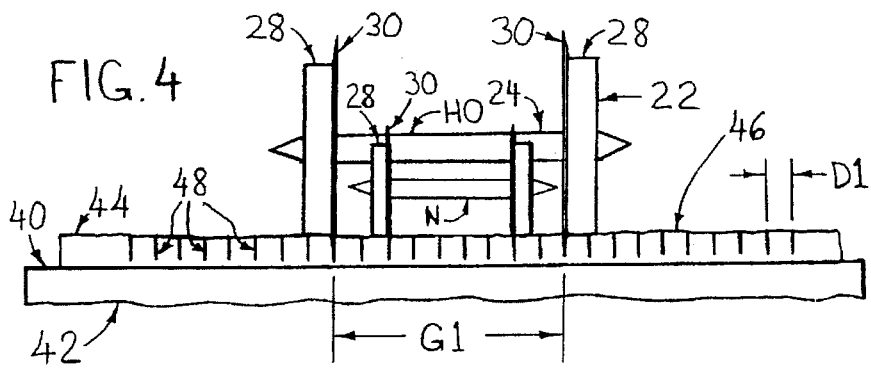
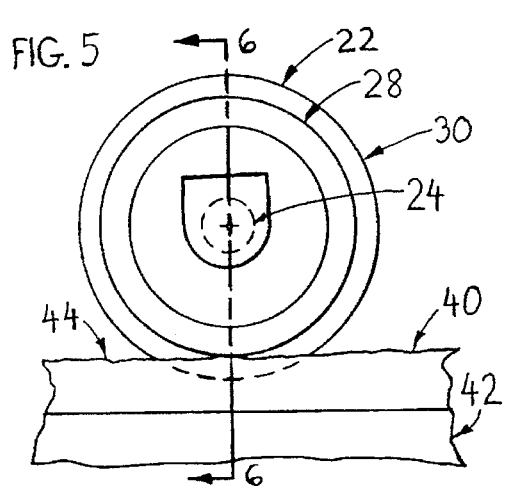
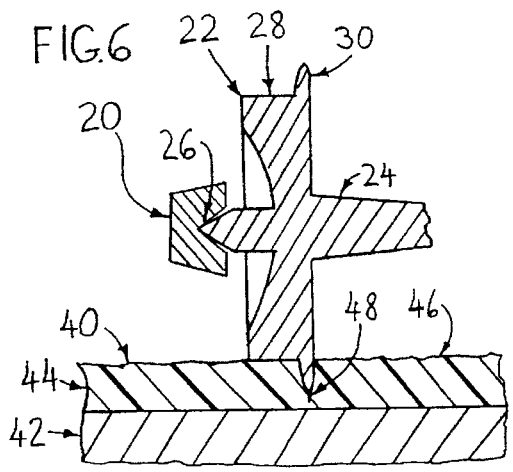

MODEL RAILROAD WHEEL CLEANING EQUIPMENT AND METHOD

BACKGROUND OF THE INVENTION

Model railroading is a widely practiced hobby, allowing the hobbyist individually to build or purchase miniature models of railway cars, engines, track layouts and settings, for use either for display only but more commonly and primarily for use as an operational system. Different standard scales have evolved, but each is substantially smaller than the full scale size of working railroad equipment, to the extent that the cars commonly would be a few inches long to a foot or so long. Nonetheless, the accuracy of model scale-down and realism to the real equipment is followed as much as possible. Thus, the model car components, including the operational truck assembly comprised of the wheels, axles and bearing mounts therefor, become very small, as accordingly does the track gauge.

For the system to be operational, such as where the cars can freely and reliably roll along the tracks, proper tolerances of the truck assembly components is critical. This includes tolerances not only of new truck assemblies, but also assemblies used by running them around the track layout awhile. Also, lubricant commonly can be applied to the truck assemblies to reduce wheel rotation drag. Due in part to the small component sizes, excessive lubricant application and leakage are common.

Lubricant leakage can coat surfaces of both the wheels and the tracks. Also, wheel rotation over the tracks may generate a static charge on these components. Either or both of these factors seems to draw dirt, dust particles or the like to the wheel assemblies during and after train usage, which over time accumulate as solid tar-like or gummy particulate buildups on the wheels and tracks, and at the wheel bearing mounts.

With the model sizes involved, even minor particulate buildups create major operational problems, such as increasing wheel drag and/or even causing car derailments.

Further, particulate buildups can be and are typically unsightly, modifying what could or should be shinny track or metal wheel surfaces, for example to a dark tar-like color.

Removal of particulate buildups from the tracks is possible and relatively easy, as the track surfaces are exposed, accessible and generally stationary, and with equipment no more complicated than a suitable solvent and an applicator/scrubber. Moreover, equipment suited to clean tracks is now commercially available.

However, cleaning the wheels and bearing mounts of the truck assemblies is a different matter. For example, the wheels have very small tread and flange surfaces, and only part of these surfaces are exposed at any time and the rest are inaccessible within the truck assembly. The bearing mounts are always inaccessible. Further, the truck assemblies and in fact the car itself, again because of the sizes involved, are not suited for rough handling in holding the car and manually abrading and/or removing the particulate buildups. Besides, each train car will typically have two truck assemblies, each with four wheels, meaning that many inches of wheel surfaces would need cleaning for just a small collection of cars, despite the scale.

SUMMARY OF THE INVENTION

This invention relates to model railroad trains, and specifically to truck assemblies comprising rotatable wheels and related bearing mounts therefor.

A basis object of this invention is to provide equipment and method for cleaning model railroad wheels or truck assemblies, and specifically for removing solid particulate buildups from the rotatable wheels and related bearing mounts therefor.

Another object of this invention is to provide such cleaning equipment and method that can be operated without disassembling the model railroad car, truck assembly, wheels or related bearing support therefor, but merely involves moving the car along and over the cleaning equipment in a prescribed manner.

Yet another object of this invention is to provide such cleaning equipment that is substantially universal in operation, allowing its use with little modifications to clean model railroad trains of different standard gauges.

The invention provides a structural base wider than the track of the model railroad car to be cleaned and longer than such car, a mat overlying the base and having a top face with preferably a pair of elongated substantially parallel grooves formed therein and extended the length of the mat and laterally spaced apart to correspond generally to the flange separation between car wheels on an axle, and the mat material being resilient, elastic, durable and receptive to hold liquid solvent effective against particulate buildups on the car wheels. The car wheels, yet assembled in a truck assembly and with the truck assemblies yet operatively mounted on the railroad car, can be cleaned by wetting the mat with the solvent, rolling the railroad car back and forth along the mat with the wheel flanges guided substantially within the grooves, sufficient to wet with solvent the wheels and related bearing mounts therefor and to abrade the particulate buildups from the car wheels.

BRIEF DESCRIPTION OF THE DRAWINGS

These and other objects, features or advantages of the invention will be more fully understood and appreciated after consideration of the following description of the invention, which includes as a part thereof the accompanying drawings, wherein:

FIG. 1 is a side elevational view of the cleaning equipment of this invention, with a typical model railroad car illustrated in an operative association therewith;

FIG. 2 is an end elevational view of the cleaning equipment of FIG. 1, and railroad car thereon;

FIG. 3 is a bottom view of one end of the railroad car of FIG. 1, and of one truck assembly used thereon;

FIG. 4 is an enlarged end elevational view, similar to FIG. 2, illustrating the groove arrangement in the cleaning equipment and how the car wheels of different standard model railroad gauges cooperate with such grooves;

FIG. 5 is a still further enlarged side view of FIG. 4, illustrating the operative cooperation between the cleaning equipment and a single wheel; and FIG. 6 is a sectional view of the cleaning equipment and wheel as taken from line-6—6 in FIG. 5, showing also a bearing mount between the axle and the side frame.

DETAILED DESCRIPTION OF A PREFERRED EMBODIMENT OF THE INVENTION

The drawings illustrate a typical model railroad car 10 with a body 12 and a pair of truck assemblies 14 connected to the body near its opposite ends. Each truck assembly 14 has a cross member 16, a pair of side frames 20 connected to the opposite ends of the cross member, and wheels 22 rotatably carried by the side frames. Each cross member 16 is connected to the car body to rotate its truck assembly about a substantially vertical axis 18. Axle 24 connects between the paired wheels, and extends beyond the wheels to cooperate with bearing mounts 26 at the ends of the side frames 20 to freely rotate the wheels 22 and axle 24 about generally horizontal axes. Each wheel 22 has a generally cylindrical tread 28 and a radial flange 30 upstanding from one end of the tread, and the flanges of the paired wheels on each axle are adjacent one another. During train use, the wheel treads 28 would ride on two spaced tracks or rails 34, guided by the flanges 30 butting against the adjacent rail sides.

The cleaning equipment or device 40 of this invention is comprised of an elongated structural base 42 and a mat 44 that overlies most of each broad upper and lower generally flat face of the base 40, the opposite mats sandwiching the base therebetween. The base 40 and mats 44 are wider than the track separation of the model railroad car 10 to be cleaned and longer than said model car.

The exposed face 46 (as illustrated in FIG. 4) of each mat 44 is generally flat and has therein elongated substantially parallel grooves or slits 48 spaced apart to receive the flanges 30 of paired wheels 22 of the truck assembly 14, to a depth where the treads 28 contacts the mat surface 46. The mat thickness and the groove depth should exceed the radial height of the flange 30 from the tread 28, but the groove preferably is of a depth less than the mat thickness to end spaced from the base 42.

Two different sizes of wheel and axle assemblies, identified as HO and N, are illustrated in FIG. 4, and many grooves (approximately twenty) are illustrated in the mat 44 at equal spacings of D1. While the identity HO and N for the wheel and axle assemblies could be arbitrary, in reality, such correspond to two very common and popular gauges of the model railroad industry. The D1 spacing is selected to provide that the paired flanges 30 of the HO gauge wheel and axle assembly fit into every ninth groove, while the paired flanges 30 of the N gauge wheel and axle assembly fit into every fifth groove.

In this context, the approximate distance G1 between the wheel flanges 30 of the HO gauge wheel and axle assembly is 0.585" and the approximate G1 distance of the N gauge is 0.325", meaning that for the cleaning device 40 to serve these two gauges, the D1 spacing would be approximately 0.065". The HO and N gauges are very popular, and might comprise in excess of two-thirds of all model railroad cars existing and in use today. Thus, a cleaning device 40 with the groove dimensions noted could serve these two model gauges to represent a significant commercial market.

Other existing model railroad train gauges include the tiny Z gauge, where the wheel flange separation G1 might be approximately 0.230", and the much larger but popular O gauge, where the wheel flange separation G1 might be approximately 1.120". Other popular gauges would include the S gauge having an approximate wheel flange separation G1 of 0.784", and the TT having an approximate wheel flange separation G1 of 0.435".

Different combinations of the groove spacing distance D1 might be provided to offer cleaning equipment or devices 40 for different popular gauges. One combination might be for the TT and HO gauges, where perhaps twenty grooves 46 might be provided with a D1 spacing of 0.087", whereby the TT gauge wheels would cooperate with the mat at five groove separations, and the HO gauge wheels would cooperate with the mat at seven groove separations. Another combination might be for the S and O gauges, where perhaps sixteen mat grooves might be provided with a D1 spacing of 0.112", so that the S gauge wheels would cooperate with the mat at seven groove separations, and the O gauge wheels would cooperate with the mat at ten groove separations. Yet another combination might be for the N and Z gauges, where perhaps twenty mat grooves might be provided with a D1 spacing of 0.046", so that the Z gauge wheels would cooperate with the mat at five groove separations, and the N gauge wheels would cooperate with the mat at seven groove separations.

In these suggested combinations, the base 40 and mats 44 should be at least one and possibly five times wider than the wheel flange separation G1 of the model railroad car 10 to be cleaned and at least as long as and up to possibly five times longer than a typical model freight car length. This sizing would allow the cleaning device 40 to be used for only one model gauge or for several model gauges.

Further, while only two different model gauges have been mentioned in each suggested combination, additional gauges could also be cleaned on the same cleaning device with a properly selected D1 groove spacing that would present receptive grooves reasonably close to correspond to the paired wheel flange distance needed for any other selected gauge. It could also be possible to have a situation where the wheel flanges on only one side of the truck assemblies would fit into a groove and be guided along the device by the mat, and the wheel flanges on the other side of the car might miss a groove and merely roll along on the surface 46 of the mat.

However, when the groove spacing D1 and the wheel flange separation G1 are properly matched, the car and its truck assemblies can be placed on the mat and moved substantially parallel to the mat grooves, causing the paired wheel flanges to become seated in any of many suitably paired grooves. Moreover, with closely spaced adjacent grooves and with sufficient groove width and/or mat compressibility, it would even be possible and acceptable to seat the paired wheel flanges of the different truck assemblies in different but closely adjacent groove pairs. The multiple groove cleaning device thus is easy and quick to use, with an expected long useful life because of the many possible combinations of appropriately paired grooves.

The mat 44 can be of a resilient, elastic and durable material, such as a rubber or a foamed plastic, capable of withstanding the working environment and of holding liquid solvent effective for removing the particulate buildups on the car wheels. An open cell foamed plastic might be preferred.

The car wheels can be cleaned by wetting the mat with a suitable solvent, positioning the wheels on the mat with the wheel flanges substantially in the grooves and rolling the railroad car back and forth along the mat sufficient to wet the wheels and abrade the wheels effective for removing particulate buildups on the wheels for cleaning the wheels.

The mat firmness should allow the wheels of the truck assemblies 14 yet secured on the car 10 to roll along the mat surface, but yet be flexible enough to closely contact the wheel flanges 30 as guided in the grooves 48 and deform enough to abrade the passing treads and flanges. The wheel flanges ride in the grooves and are guided by the mat adjacent the grooves, to keep the car from veering to either side and off of the mat. Without the groove steering, the truck assemblies would not typically roll straight, particularly when riding over the yielding resilient mat surface.

The base 42 can be of any structural, durable and economical material capable of withstanding the working environment, such as wood or plastic.

The mat 44 can be held fast to base 42 by adhesive capable of withstanding the working environment. With the blend of a wood base and a foamed open cell plastic mat, and the presence ultimately of the solvent, a general purpose cyanoacrylate adhesive such as sold by Fel-Pro Chemical Products L. P. of Skokie, Ill. under the PRO-GRIP 5500 or 7000 trade names has been found acceptable.

A solvent of mineral spirits will generally be effective to wet and cut the particulate buildups, as would a liquid cleaner marketed by Magic American Corporation of Cleveland, Ohio under the trade name GOO GONE.

The mat material being resilient and having minute open cells can receive and hold liquid solvent to then both adequately wet and abrade the wheel assemblies, for effectively removing particulate buildups on the car wheels and bearing mounts. For a model car having severe particulate buildups, it may be desirable to use the cleaning device several times in succession, each separated by a short duration with the car set aside, thereby letting the solvent penetrate into the particulate to then be removed by the next ride on the cleaning device.

After the wheel assemblies have been cleaned on one of the mats 44, the cleaning device 40 could be flipped over to exposed the other mat, which can be either coated with a different solvent or could be yet dry. This could serve then to dry the wheels and to abrade the exposed surfaces for polishing such surfaces. After this treatment, the exposed surfaces of the wheel assemblies appear new, with virtually all particulate buildups effectively removed. Further, the bearing mounts 26 should be cleared of buildups, making wheel rotation easier for free movement of the cleaned car along the rails 34.

The cleaning device itself can be cleaned by wetting it with the solvent and then wiping it with a paper towel or the like. Further, the above-mentioned GOO GONE solvent is water soluble, allowing the cleaning device to be cleaned by flushing it under water and then towel drying it.

While a specific embodiment has been illustrated, it will be obvious that minor changes could be made therefrom without departing from the spirit of the invention. Accordingly, the invention is to determined by the scope of the following claims.

What is claimed is:

1. In combination with a portable model railroad car having wheel flange separation of less than approximately 1.12", wheel cleaning device, comprising a structural base and a mat overlying the base, said mat having a substantially flat top face that is wider than the flange separation of the model railroad wheels to be cleaned and longer than the length of the model railroad car supported on the wheels, the mat being of durable, resilient and elastic rubber or foamed plastic material having minute open cells capable of holding liquid solvent effective for removing particulate buildups on the wheels, said mat further having a groove formed therein from the top face and extended substantially the length of the mat spaced from but substantially adjacent one side edge thereof suited to receive wheel flanges on one side of the railroad car with the wheels on the other side of the railroad car being against the mat, all wheels effectively being cleaned by wetting the mat with solvent, positioning the wheels against the mat and rolling the railroad car along the mat to seat the one side wheel flanges substantially in the groove and for wetting end abrading the wheels for removing particulate buildups therefrom.

2. A model railroad car in combination with a wheel cleaning device according to claim 1, further comprising said mat having a second elongated groove formed therein from the top face and extended substantially the length of the mat and substantially parallel to the first mentioned groove, the grooves being spaced apart a distance corresponding to the wheel flange separation of the model railroad wheels suited to receive simultaneously the wheel flanges on both sides of the model car to be cleaned.

3. A model railroad car in combination with a wheel cleaning device according to claim 1, further comprising said mat having a plurality of elongated grooves formed therein from the top face and each extended substantially the length of the mat and substantially parallel to the first mentioned groove, the adjacent grooves being spaced apart substantially equal distances where a whole number multiple of such spacing distance corresponds to the wheel flange separation of a model railroad gauge and where a sufficient number of grooves are in the mat to exceed said wheel flange separation to thereby have more than one pair of grooves suited to receive simultaneously the wheel flanges on both sides of the model car to be cleaned.

4. A model railroad car in combination with a wheel cleaning device according to claim 3, further comprising said groove spacing distance being any one of approximately:

0.046", whereby Z gauge wheels would cooperate at five groove separations, and the N gauge wheels would cooperate at seven groove separations;

0.065", whereby N gauge wheels would cooperate at five groove separations, and HO gauge wheels would cooperate at nine groove separations;

0.087", whereby TT gauge wheels would cooperate at five groove separations, and HO gauge wheels would cooperate at seven groove separations; or 0.112", whereby S gauge wheels would cooperate at seven groove separations, and the O gauge wheels would cooperate at ten groove separations.

5. A model railroad car in combination with a wheel cleaning device according to claim 3, further comprising the base having broad upper and lower generally flat faces, and opposing mats overlying the upper and lower generally flat faces and substantially sandwiching the base therebetween, suited to use either mat for cleaning the railroad car wheels.

6. A model railroad car in combination with a wheel cleaning device according to claim 3, further comprising the mat thickness and each groove depth exceeding the radial height of the wheel flanges.

7. A model railroad car in combination with a wheel cleaning device according to claim 6, further comprising each groove depth being less than the mat thickness.

8. A model railroad car in combination with a wheel cleaning device according to claim 3, further comprising the base and mat being up to approximately five times wider than the flange separation of the model railroad car to be cleaned and up to approximately five times longer than a typical model freight car length.

9. In combination with a portable model railroad car, a cleaning device for truck assemblies for said model railroad car, each truck assembly being connected to the car to rotate about a first axis and paired wheels rotatably carried by the truck assembly to freely rotate about second axes generally normal to the first axis, each wheel having a tread and a flange upstanding from one end of the tread, and the flanges of paired wheels being adjacent one another while defining therebetween a flange separation of less than approximately 1.12", the cleaning device comprising a structural base and a mat overlying the base, said mat having a top face with a pair of elongated substantially parallel grooves formed therein and laterally spaced apart to correspond to the paired wheel flange separation, and the mat material being of rubber or foamed plastic and being durable, resilient, elastic and having minute open cells, capable of holding liquid solvent effective for removing particulate buildups on the wheels, the truck assemblies being cleaned by wetting the mat with solvent, positioning the truck assembly wheels on the mat with the wheel flanges in the grooves and rolling the wheel treads along the mat in line with the grooves operable to wet and abrade the wheels for removing particulate buildups therefrom.

10. A method of cleaning model railroad car wheels, comprising the steps of providing a cleaning device comprising a structural base and a mat overlying the base, said mat having a substantially flat top face that is wider than the flange separation of the model railroad wheels to be cleaned and longer than the length of the model railroad car supported on the wheels, the mat being of durable, resilient and elastic rubber or foamed plastic material having minute open cells capable of holding liquid solvent effective for removing particulate buildups on the wheels, said mat further having a groove formed therein from the top face and extended length of the mat spaced from but substantially adjacent on side edge thereof suited to receive wheel flanges on one side of the railroad car with the wheels on the other side of the railroad car being against the mat, wetting the mat with solvent, positioning the car wheels against the mat with the wheel flanges on one side of the model railroad car substantially in an elongated groove in the mat and rolling the railroad car along the mat to wet and abrade the wheels for removing particulate buildups from the wheels.

11. A method of cleaning model railroad car wheels according to claim 10, further comprising providing on the cleaning device mat a second elongated groove extended substantially parallel to the first groove and spaced therefrom a distance corresponding to the wheel flange separation of the model railroad wheels suited to receive simultaneously the wheel flanges on both sides of the model car to be cleaned for rolling the railroad car along the mat and removing particulate buildups from the wheels.

12. A method of cleaning model railroad car wheels according to claim 11, further comprising the steps of providing on the cleaning device a second mat of substantially the same structure as the first mat, and operable after completing the cleaning steps first enumerated on the first mat by positioning the car wheels against the second mat with the wheel flanges substantially in elongated mat grooves and rolling the railroad car along the second mat to dry and abrade the wheels.

* * * * *